United States Patent
Fang et al.

(10) Patent No.: US 8,102,818 B2
(45) Date of Patent: Jan. 24, 2012

(54) PILOT GROUPING IN WIRELESS COMMUNICATION NETWORKS

(75) Inventors: Yonggang Fang, San Diego, CA (US); Rajesh Bhalla, Westmont, IL (US); Hua Mary Chion, Belle Mead, NJ (US)

(73) Assignee: ZTE (USA) Inc., Iselin, NJ (US)

( * ) Notice: Subject to any disclaimer, the term of this patent is extended or adjusted under 35 U.S.C. 154(b) by 942 days.

(21) Appl. No.: 12/029,437

(22) Filed: Feb. 11, 2008

(65) Prior Publication Data
US 2008/0214201 A1    Sep. 4, 2008

Related U.S. Application Data

(60) Provisional application No. 60/889,256, filed on Feb. 9, 2007.

(51) Int. Cl.
*H04W 36/00* (2009.01)
(52) U.S. Cl. ......... 370/332; 370/335; 455/437; 455/513
(58) Field of Classification Search ........................ None
See application file for complete search history.

(56) References Cited

U.S. PATENT DOCUMENTS

| | | | |
|---|---|---|---|
| 6,233,455 B1 * | 5/2001 | Ramakrishna et al. | 455/437 |
| 6,272,122 B1 | 8/2001 | Wee | |
| 6,415,149 B1 * | 7/2002 | Bevan et al. | 455/442 |
| 6,782,261 B1 * | 8/2004 | Ahmed et al. | 455/436 |
| 2006/0205415 A1 * | 9/2006 | Rezaiifar et al. | 455/452.2 |
| 2007/0066232 A1 * | 3/2007 | Black | 455/67.11 |
| 2007/0201439 A1 * | 8/2007 | Sun et al. | 370/352 |

OTHER PUBLICATIONS

3$^{rd}$ Generation Partnership Project 2 "3GPP2,*Connection Control Plane for Ultra Mobile Broadband (UMB) Air Interface Specification*," 3GPP2 C.S0084-006-0, Version 1.0, Apr. 2007, 188 pages.
Bi, Qi, "A Forward Link Performance Study of the 1xEV-DO Rev. 0 System using field measurements and simulations," Lucent Technologies, Mar. 2004, 19 pages.
EV-DO Rev B, A Technical Whitepaper, Airvana mobile broadband, 10 pages.

* cited by examiner

*Primary Examiner* — Robert Scheibel
(74) *Attorney, Agent, or Firm* — Perkins Coie LLP

(57) ABSTRACT

Systems and techniques for grouping channels, such as pilots, are described. In one aspect, a method includes receiving transmissions of two or more pilot signals at an access terminal of a wireless communications network that includes an access node, based on characteristics of the transmissions of the two or more pilot signals from the access node to the access terminal, determining whether the two or more pilot signals are suitable for grouping and indicating of the suitability of the two or more pilot signals for grouping by sending a pilot information report for the pilot group to the access node.

20 Claims, 6 Drawing Sheets

PILOT GROUPING IN WIRELESS COMMUNICATION NETWORKS

CROSS-REFERENCE TO RELATED APPLICATIONS

This application claims the priority of U.S. Provisional Application Ser. No. 60/889,256, filed on Feb. 9, 2007 and entitled "PILOT GROUPING IN WIRELESS COMMUNICATION NETWORKS," the contents of which are incorporated herein by reference.

BACKGROUND

This disclosure relates to the wireless communication networks such as cellular mobile communication networks.

Many wireless communication networks can include different channels with which an access node or base station can exchange information with an access terminal or mobile station. Examples of such channels include pilot channels, synchronization channels, paging channels, and traffic channels.

A pilot channel is a forward-link channel from an access node to access terminals. A pilot channel can be used by access terminals to a variety of different ends. For example, depending on the particulars of the wireless communication system, access terminals can use a pilot channel to acquire timing phase synchronization, as a reference to measure the signal strength from the access node, to identify a sector, as a coherent reference signal in the demodulation of coherent Binary Phase Shift Keying (BPSK) modulation, and/or to identify a multipath-delay structure.

A pilot channel can be modulated by a pilot pseudonoise spreading code. In digital wireless communication networks, pseudonoise codes are binary sequences that appear random over relatively long periods and exhibit noise-like properties. In some implementations, the pilot pseudonoise spreading code is common to different channels transmitted from a given base station. The power level at which a pilot channel is transmitted is typically higher than the power of other channels and can be, e.g., on the order of 25% of the total forward-link power.

SUMMARY

Systems and techniques for grouping channels, such as pilots, are described. In one aspect, a method for providing communications between an access node (AN) and one or more access terminals (ATs) in a multi-carrier wireless network includes broadcasting a Pilot Pseudo-Noise (PN) of each neighboring sector pilot to each AT in an overhead message generated by the AN, measuring pilot signals received at each ATs that are on different frequency channels, comparing signal strengths of the received pilots that have the same Pilot PN and belong to the AN, selecting pilots with signal strengths within a threshold to form a pilot group, and after formation of the pilot group, reporting pilot strength measurement of only one pilot from the pilot group to the AN.

This and other aspects can include one or more of the following features. Pilots can be selected in a pilot group that subsequently fail to meet the threshold to form at least one different group. The formed pilot group can subsequently be modified by removing one or more pilots that previously met the threshold for the formed virtual pilot group and no longer meet the threshold. An overhead message can be sent from the AN. The overhead message can identify the pilots and the group.

In another aspect, a method includes receiving transmissions of two or more pilot signals at an access terminal of a wireless communications network that includes an access node, based on characteristics of the transmissions of the two or more pilot signals from the access node to the access terminal, determining whether the two or more pilot signals are suitable for grouping, and indicating of the suitability of the two or more pilot signals for grouping by sending a pilot information report for the pilot group to the access node.

This and other aspects can include one or more of the following features. Whether the two or more pilot signals are suitable for grouping can be determined by determining, at the access terminal, whether strengths of the pilot signals fall within a range. Information characterizing the range in an overhead message from the access node can be received at the access terminal. Individual pilot information reports for the two or more pilot signals can be sent to indicate the suitability of the two or more pilot signals for grouping. The method can also include receiving the indication of the suitability at the access node, and in response to the receipt of the indication, broadcasting an overhead message identifying the two or more pilot signals as a pilot group.

Whether all candidate pilot signals are in the pilot group can be determined and subsequent transmissions of identifications of the pilot group can be disabled. The indication of the suitability can be received at the access node in a pilot information report and, in response to the receipt of the indication, an overhead message identifying that a pilot group has been disbanded can be broadcast.

In another aspect, an access terminal includes a strength determining module configured to determine a strength of pilot signals received at the access terminal, a comparison module configured to compare strengths of pilot signals received at the access terminal with a range of pilot strengths to determine whether the strengths of pilot signals are sufficiently similar to be suitable for grouping, and an overhead message-generating module configured to indicate suitability of two or more pilots for grouping by sending measurements of one of the two or more pilots to the access node.

This and other aspects can include one or more of the following features. The access terminal can include a strength range data store configured to store the strength range.

In another aspect, an article includes one or more tangible machine-readable data storage media storing instructions operable to cause one or more machines to perform operations. The operations include receiving transmissions of two or more pilot signals of a wireless communications network that includes an access node, comparing strengths of the transmissions of the two or more pilot signals with a range to determine whether the two or more pilot signals are suitable for grouping, and based on results of the comparison, sending a message to an access node indicating that the two or more pilot signals are suitable for grouping.

This and other aspects can include one or more of the following features. The operations can also include receiving a subsequent message identifying that the two or more pilot signals are in a pilot group, and reporting the pilot group rather than the two or more pilot signals in the pilot group.

In another aspect, a method includes receiving transmissions of two or more pilot signals of a wireless communications network that includes an access node, comparing strengths of the transmissions of the two or more pilot signals in pilot group with a range to determine whether the two or more pilot signals are suitable for grouping, and based on results of the comparison, sending a message to an access node indicating that the two or more pilot signals are unsuitable for grouping.

This and other aspects can include one or more of the following features. The message indicating that the two or more pilot signals are unsuitable for grouping can include reports of pilot strength measurement of each individual pilot.

In another aspect, a method includes receiving pilot strength measurement reports at an access node, determining whether the strengths of two or more pilots described in the pilot strength measurement reports are sufficiently dissimilar to warrant a change in grouping of the two or more pilots, changing the grouping of the two or more pilots based on the strengths of two or more pilots described in the pilot strength measurement reports, and broadcasting an identification of the changed group.

This and other aspects can include one or more of the following features. The identification of the changed group can be broadcast as an overhead message indicating that a new group has been formed. The method can include determining that more than one pilot measurement strength reports has not been received for pilots from the same access node and having the same pseudonoise code, and disabling dynamic grouping of the pilots at the access node.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
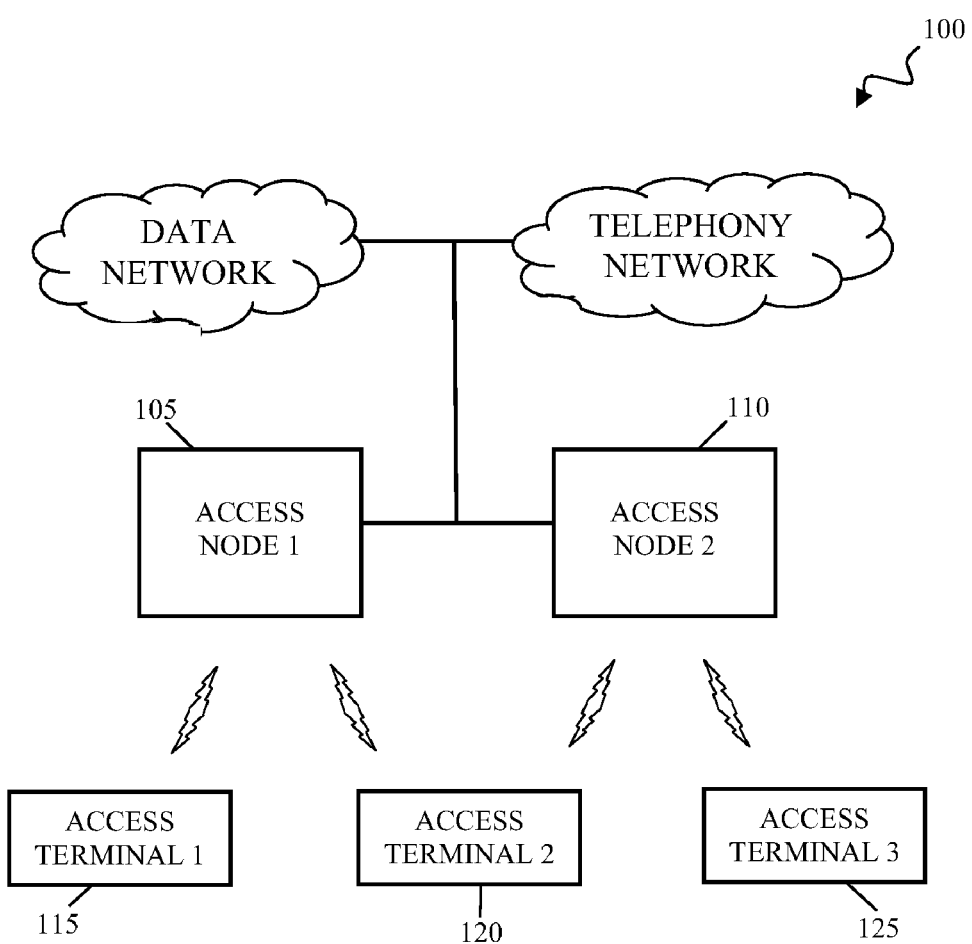
FIG. 1 is a schematic representation of a wireless communications network.

FIG. 1 is a schematic representation of a wireless communications network 100. Network 100 includes a collection of one or more access nodes or base stations (AN) 105, 110 that communicate wirelessly with a collection of one or more access terminals or mobile stations (AT) 115, 120, 125. Each AN 105, 110 can include one or more of a base station controller (BSC), a base-station transceiver system (BTS), an access point (AP), a modem pool transceiver (MPT), or the like. Each AT 115, 120, 125 can include one or more of a wired phone, a wireless phone, a cellular phone, a laptop computer, a wireless communication personal computer (PC) card, a personal digital assistant (PDA), an external or internal modem, or the like. Communications between AT 115, 120, 125 and AN 105, 110 can place AT 115, 120, 125 in communication with one or more networks, such as a core data network and/or a telephony network.

One or more of the resources available for communications between each AN 105, 110 and AT 115, 120, 125 can be "divided" for multiple access. Such division can reduce interference between different transmissions and allow more efficient use of the divided resource. For example, communications can be divided in time (e.g., time division multiple access (TDMA)), in frequency (e.g., frequency-division multiple access (FDMA)), in phase, in space, in code (e.g., code division multiple access (CDMA), and/or in combinations thereof for multiple access.

In some implementations, communications between AN 105, 110 and AT 115, 120, 125 can include a collection of pilot channels that are each modulated by a pilot pseudonoise spreading code. Each pseudonoise code can be a binary sequence that appears random over a relatively long period and exhibits noise-like properties. Each particular pilot pseudonoise spreading code can appear in multiple pilot channels. The different pilot channels can appear at different frequencies. Moreover, different pilot channels can have different pseudonoise offsets.

Figure 2:
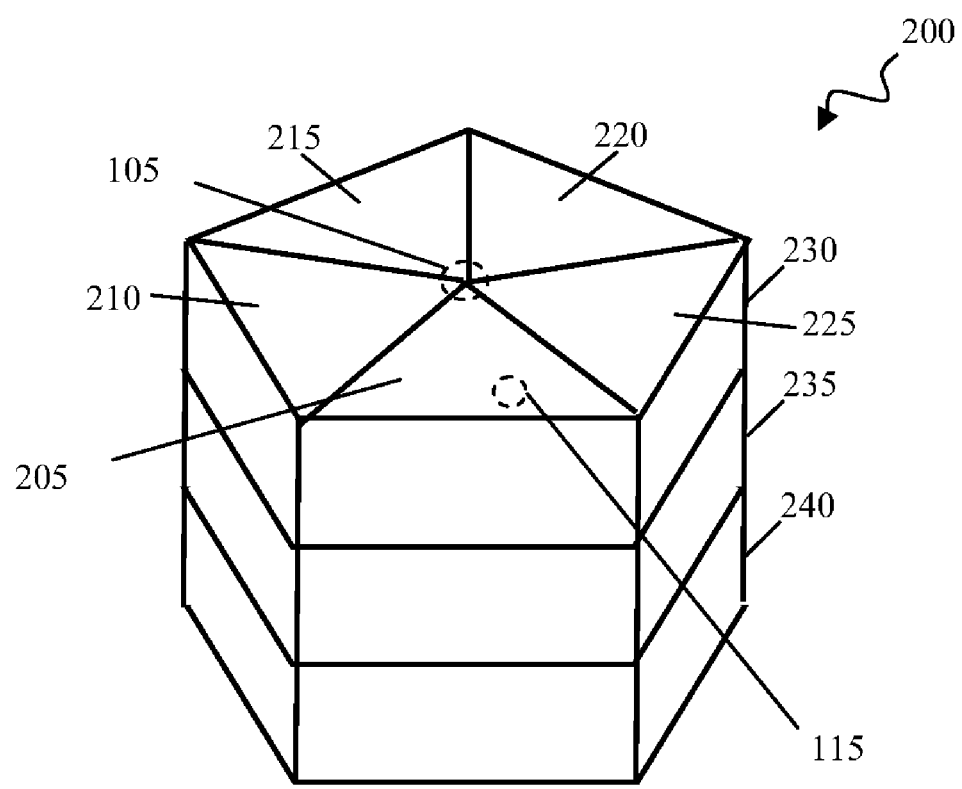
FIG. 2 is a schematic representation of a cell in a multi-carrier communication system.

FIG. 2 is a schematic representation of a cell 200 in a multi-carrier communication system in which a particular pilot pseudonoise spreading code can appear at different frequencies in multiple pilot channels. Cell 200 is the coverage area serviced by AN 105, and is shown as generally pentagonal in shape. The coverage area of cell 200 can be divided into a collection of different sectors 205, 210, 215, 220, 225. Moreover, a collection of different frequencies 230, 235, 240 can be assigned to cover the different sectors 205, 210, 215, 220, 225 of cell 200. For the sake of convenience, the spatial arrangement of sectors 205, 210, 215, 220, 225 is shown in the division of the generally pentagonal cell 200 into five different generally triangular regions. The frequency allocation to cell 200 is shown in the three different levels. Cells such as cell 200 can have different shapes and different numbers of sectors and can be assigned different numbers of frequencies.

In the illustrated example, sector 205 of cell 200 includes AT 115. As shown, multiple frequencies 230, 235, 240, and hence multiple pilot signals, are associated with a sector 205. During operation, AT 115 can receive the multiple pilot signals. For example, AT 115 can receive pilot signals for each of frequencies 230, 235, 240 associated with sector 205. In some circumstances, AT 115 can receive pilot signals associated with other sectors, such as sectors 210, 225.

AT 115 can be configured to report, in an overhead message, pilot information to AN 105 in response to the receipt of one or more of the pilot signals. The reported pilot information can include pilot pseudonoise information, pilot strength information, drop timer status information, and the like. In some implementations, AN 105 can use such pilot information to add or drop the pilot to/from the active and/or candidate set.

In some implementations, AT 115 need not report pilot information to AN 105 for every individual pilot signal it receives. Instead, AT 115 can report information for a pilot group. A pilot group is a collection of pilot signals that have common characteristics. For example, a pilot group is a collection of pilot signals that are on different frequency channel bands and that have the same pilot pseudonoise code. In some implementations, pilots in a pilot group can be constrained to originate from the same access node. In some implementations, pilots in a group can be constrained to be transmitted at the same power. Additional details regarding such pilot grouping can found in 3GPP2 standards, such as EV-DO Rev B and Rev C (also known as Ultra Mobile Broadband (UMB)). In some implementations, AT 115 can report pilot information for a pilot group by reporting pilot information for a representative member of the group. By reporting pilot information for a pilot group rather than for all the individual members of the group, the amount of traffic in the system, and hence the overhead on the air-interface resources, can be reduced.

Figure 3:
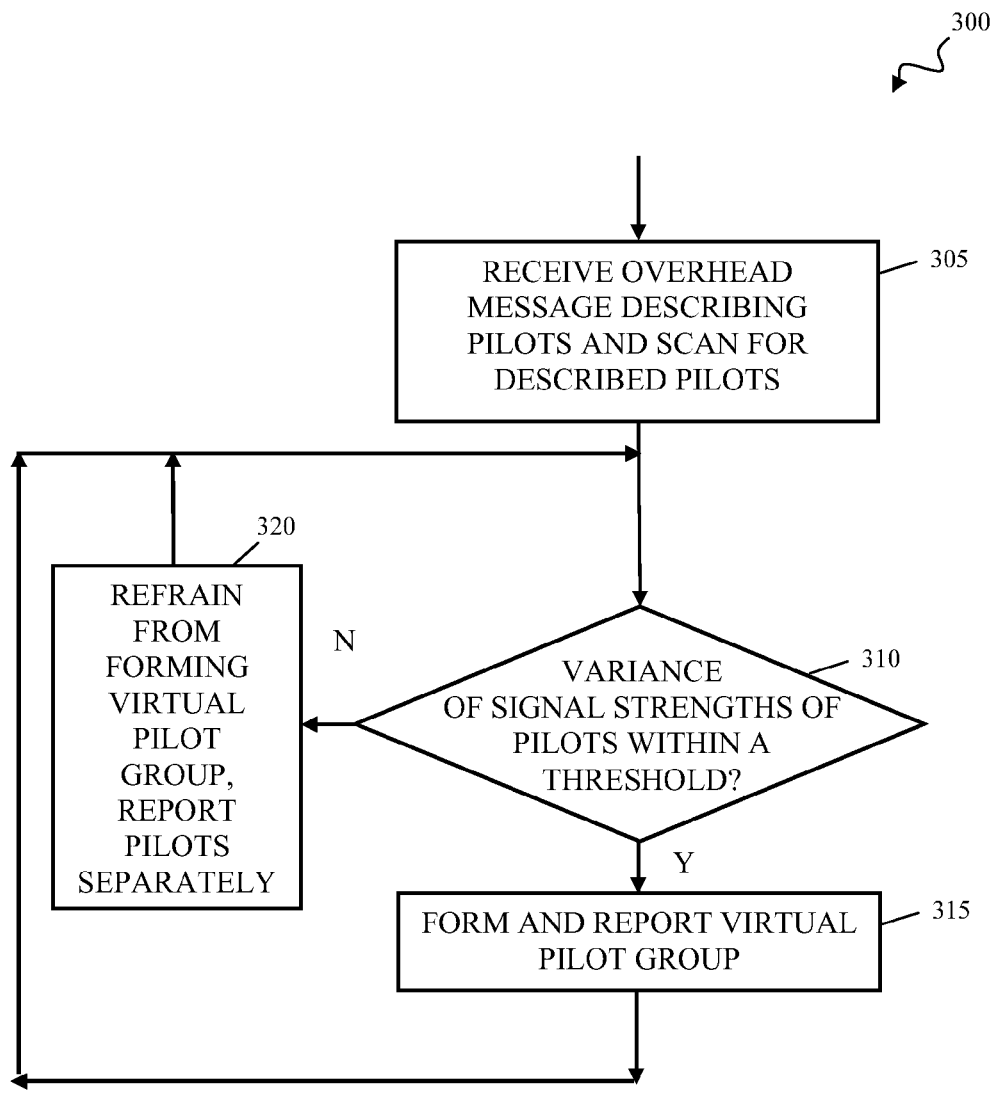
FIG. 3 is a flowchart of a process for grouping pilots in a pilot group at an access terminal.

FIG. 3 is a flowchart of a process 300 for grouping pilots in a pilot group at an access terminal. Process 300 can be performed by one or more data processing devices that perform operations in accordance with the logic of a set of machine-readable instructions. For example, process 300 can be performed by an access terminal in accordance with the logic of a set of software.

The system performing process 300 can receive an overhead message that includes information describing a collection of neighboring pilots and scan for the described pilots at 305. Upon locating the pilot signals, the system performing process 300 can determine whether or not two or more of the pilot signals are suitable for grouping at 310. In some implementations, the determination can be based at least in part on one or more characteristics of the transmission from the AN to the AT of the pilot signals. For example, the determination whether pilot signals are suitable for grouping can be based on a similarity in pilot strength of the pilot signals. A similarity in pilot strength can be determined by comparing the pilot strengths to a threshold range of pilot strengths. If the variance of the pilot strengths fall within the threshold range, the pilot signals may be suitable for grouping. In this manner, the determination as to whether pilots are suitable for grouping can be based, at least in part, on the real-world characteristics of the transmission of the pilots and can accommodate factors such as the deployment of transmitters, environmental effects, aging, manufacturing differentials, and the like.

In some implementations, the range in which the located pilot signals can be required to fall can be predetermined. For example, the range can be broadcast from an access node in an overhead message. In some implementations, the range is broadcast in conjunction with additional information that allows the system performing process 300 to perform one or more other checks to determine if the pilot signals are suitable for grouping. For example, the range can be broadcast in conjunction with a neighbor pilot pseudonoise code and access node ID that allows the access terminal to categorize the pilots to be within a pilot group.

If the system performing process 300 determines that pilot signals are suitable for grouping, the system performing process 300 can form and report a virtual pilot group at 315. For example, the system performing process 300 can report the formation of a group by reporting, to the access node, only one representative pilot of a group of pilots. The reporting can be done in a pilot strength measurement report message.

After reporting the formation of a group, the system performing process 300 can return to 310 to process the remaining pilot signals.

If the system performing process 300 determines that the located pilot signals are not suitable for grouping, the system performing process 300 can refrain from forming a virtual pilot group and report each pilot separately at 320. For example, a separate pilot measurement report message can be sent to the access node for each individual pilot. After sending such pilot measurement reports to the access node, the system performing process 300 can return to 310 to process other remaining pilot signals.

Figure 4:
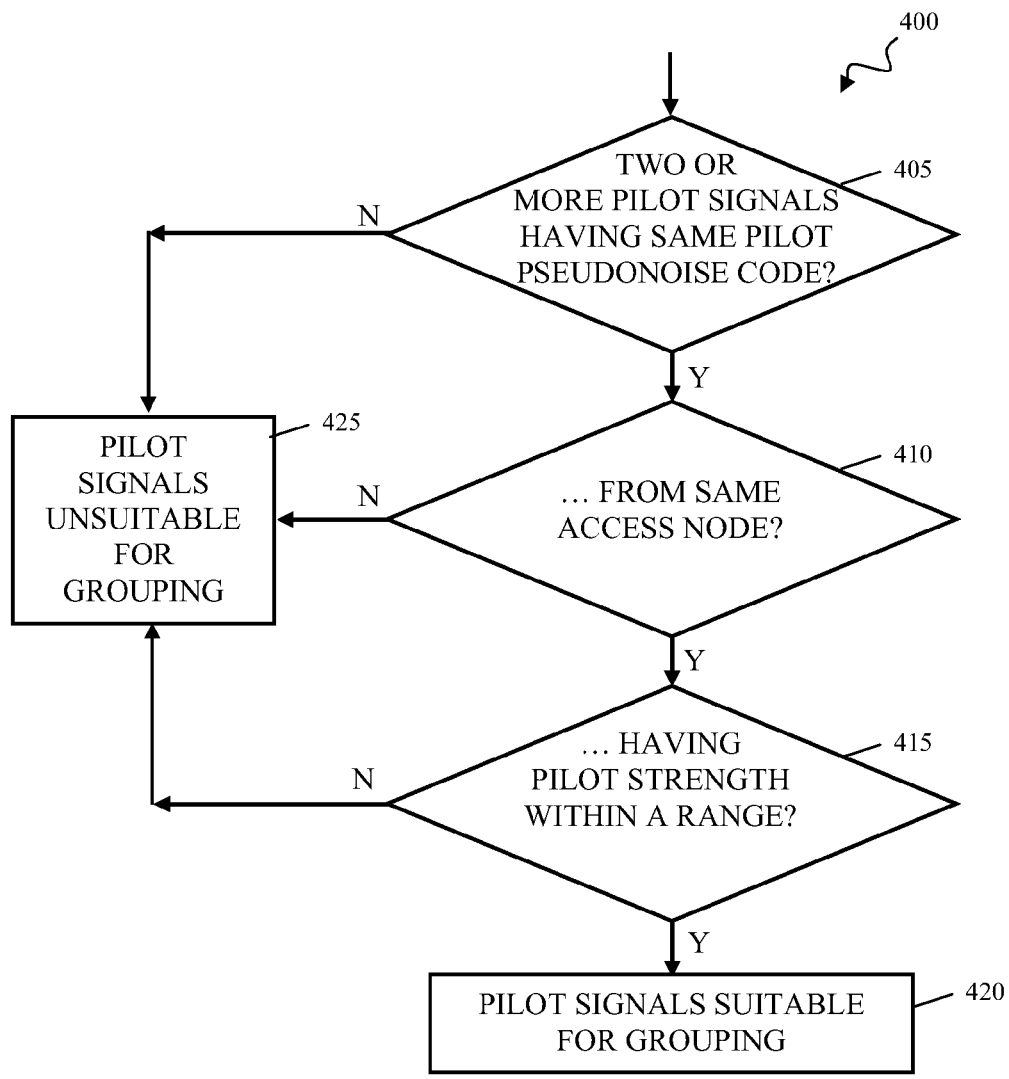
FIG. 4 is a flowchart of a process for determining whether pilot signals are suitable for grouping in a pilot group.

FIG. 4 is a flowchart of a process 400 for determining whether pilot signals are suitable for grouping in a pilot group. Process 400 can be performed by one or more data processing devices that perform operations in accordance with the logic of a set of machine-readable instructions, alone or in conjunction with other data processing activities. For example, process 400 can be performed at 310 in process 300 by an access terminal.

The system performing process 400 can determine if two or more of the received pilot signals have the same pilot pseudonoise code at 405. As discussed previously, the same pilot pseudonoise code can be used, e.g., in pilots that are transmitted at different frequencies and/or with different pseudonoise offsets.

The system performing process 400 can also determine if two or more of the pilot signals are from the same access node at 410. In some cases, sectors of different access nodes may overlap. Even if pilots from such different access nodes use the same pilot pseudonoise code, a system performing process 400 will determine that they are unsuitable for grouping at 410.

The system can also determine if two or more of the pilot signals have pilot strengths that are sufficiently similar so as to fall within a pilot strength threshold range at 415. Thus, rather than basing the determination as to whether grouping is appropriate on the power levels at which the pilot signals are transmitted from an access node (i.e., transmit power), the system performing process 400 bases the determination on the strength at which the pilot signals are received. In this manner, the determination as to whether grouping is appropriate is based, at least in part, on the real-world characteristics of the transmission of the pilots and can accommodate factors such as the deployment of transmitters, environmental effects, aging, manufacturing differentials, and the like.

In some implementations, the range in which the located pilot signals can be required to fall can be predetermined. For example, the range can be broadcast from an access node in an overhead message. In some implementations, the range is broadcast in conjunction with additional information that allows the system performing process 400 to perform one or more other checks to determine if the pilot signals are suitable for grouping. For example, the range can be broadcast in conjunction with a neighbor pilot pseudonoise number that allows the access terminal to categorize the pilots to be within a pilot group.

If the system performing process 400 determines, at 405, that the pilot signals do not have the same pilot pseudonoise code, or if the system determines, at 410, that the pilot signals are not from the same access node, or if the system determines, at 415, that the pilot signals do not have sufficiently similar pilot strengths, then the systems designates the pilot signals as unsuitable for grouping at 425. On the other hand, if the system performing process 400 determines, that the pilot signals do have the same pilot pseudonoise code at 405, that the pilot signals are from the same access node at 410, and that the pilot signals do have sufficiently similar pilot strengths at 415, then the systems designates the pilot signals as suitable for grouping at 420.

Figure 5:
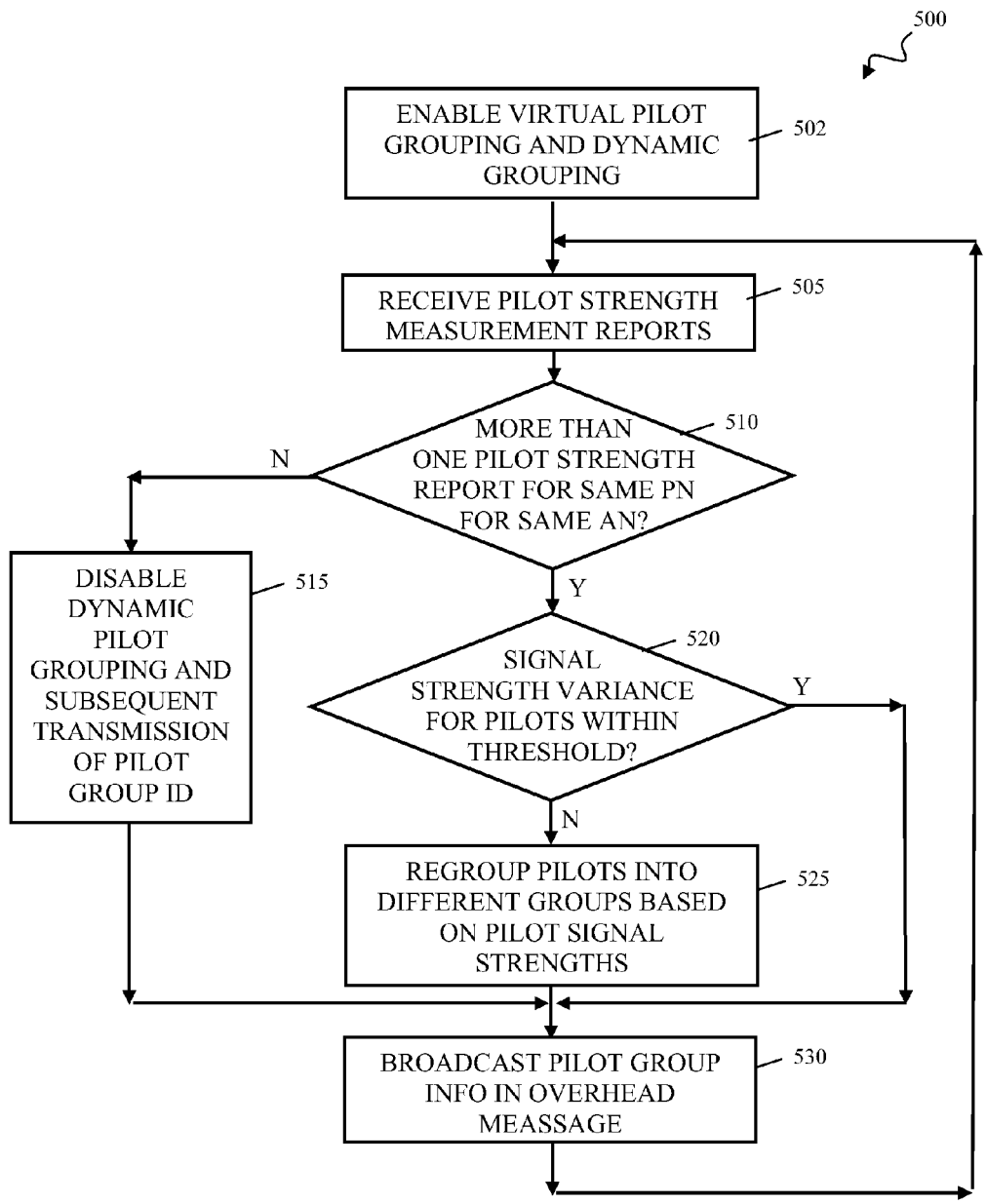
FIG. 5 is a flowchart of a process for grouping pilot signals at an access node based on pilot measurements reported by an access terminal.

FIG. 5 is a flowchart of a process 500 for grouping pilot signals at an access node based on pilot measurements reported by an access terminal. Process 500 can be performed by one or more data processing devices that perform operations in accordance with the logic of a set of machine-readable instructions, alone or in conjunction with other data processing activities. For example, process 500 can be performed by an access node that receives pilot strength measurement messages indicating that pilot signals can be grouped or ungrouped from an access terminal performing process 300.

The system performing process 500 can enable virtual pilot grouping by an access terminal and dynamic grouping access node at 502. For example, an overhead message can include a bit or other indicator that enables virtual pilot grouping and dynamic grouping in a wireless communication network, as discussed further below.

The system performing process 500 can receive pilot strength measurement report messages at 505. The report messages can pertain to individual pilots or the report messages can pertain to a virtual group of pilots that has been established by an access terminal, e.g., in accordance with process 300 (FIG. 3).

The system performing process 500 can determine whether the pilots for which reports are received at 505 are candidates for being grouped. Pilots that are candidates for being groups satisfy grouping criteria, include criteria based on the real-world characteristics of the transmission of the pilots to access terminals.

For example, in the implementation illustrated in process 500, the system performing process 500 can determine whether two or more pilot reports relate to pilots from the same access node and have the same pseudonoise code at 510. If the system performing process 500 determines that such pilot reports do not exist, then the system disables dynamic pilot grouping and any subsequent transmission of pilot group ID's from the access node to access terminals in overhead messages at 515.

As another example, the system performing process 500 can determine whether the signal strength variance of pilots from the same access node and having the same pseudonoise code is within a defined threshold range at 520. If the system performing process 500 determines the signal strength variance of pilots is not within a defined threshold range, then the system regroups the pilots into different groups based on those signal strengths at 525.

After the regrouping or if the system performing process 500 determines the signal strength variance of pilots is within the defined threshold range, then the system broadcasts pilot group information in an overhead message at 530. For example, in one implementation, the parameter DynamicPilotGroupingEnabled bit is enabled in an overhead message and a corresponding pilot group identification number, along with the identity of members, can be broadcast to indicate grouping of the candidate pilots. The system performing process 500 can also return to 505 and await the receipt of subsequent pilot strength measurement report messages.

Figure 6:
FIG. 6 is a schematic representation of an overhead message that can be used to communicate pilot grouping capability and pilot grouping parameters to an access terminal.

FIG. 6 is a schematic representation of an example overhead message 600 that can be used to communicate pilot grouping information from an access node to a access terminal. For example, overhead message 600 can be broadcast from an access node at 530 in process 500 (FIG. 5).

Overhead message 600 includes several fields. In some implementations, overhead message 600 includes several fields that are in accordance with 3GPP2 standards such as such as EV-DO Rev B and Rev C (also known as Ultra Mobile Broadband (UMB)). Examples of such fields include a MessageID field 605, a CountyCode field 610, a NetworkCode field 615, a SectorID field 620, and an ANGroupID field 625. Overhead message 600 can also include additional fields, such as a VirtualPilotGroupIncluded field 630, a VirtualPilotGroupThreshold field 635, a DynamicPilotGroupingEnabled field 640, and a PilotGroupID field 645.

MessageID field 605 includes an identifier of overhead message 600. CountyCode field 610 includes an identifier of the country from which overhead message 600 is sent. NetworkCode field 615 includes an identifier of the network in which overhead message 600 is sent. SectorID field 620 includes an identifier of the sector from which overhead message 600 is sent. ANGroupID field 625 includes an identifier of the access node from which overhead message 600 is sent. For example, ANGroupID field can include an identifier for access node 105 or access node 110 (FIG. 1).

VirtualPilotGroupIncluded field 630 includes a bit indicator that indicates whether or not information regarding a threshold range for determining whether pilot signals are suitable for grouping is included in overhead message 600. For example, when the VirtualPilotGroupIncluded field is set to "1," this can indicate that a threshold range is included in overhead message 600. Otherwise, when the VirtualPilotGroupIncluded field is set to "0," this can indicate that a threshold range is not included in overhead message 600. In some implementations, individual access terminals can use a predetermined default value when a threshold range is not included.

VirtualPilotGroupThreshold field 635 includes information characterizing a threshold range for determining whether pilot signals are suitable for grouping. The threshold range can be a range of received power strengths of the pilots. When two or more pilots fall within the characterized range, they can be considered, by an access terminal, to be suitable for grouping. In one implementation, the range of received power strengths is expressed as an unsigned binary number in units of, e.g., 0.25 dB. The range of received power strengths in dB can be given by the value plus one times 0.25 dB.

DynamicPilotGroupingEnabled field 640 includes a bit indicator that indicates whether or not pilot groupings can be changed at the access node and whether or not a PilotGroupID is included in overhead message 600. For example, when the DynamicPilotGroupingEnabled field is set to "1," this can indicate that pilot groupings can be changed and that an identifier of a pilot group is included in overhead message 600. Otherwise, when the DynamicPilotGroupingEnabled field is set to "0," this can indicate that pilot groupings cannot be changed and that an identifier of a pilot group is not included in overhead message 600.

PilotGroupID field 645 includes information identifying one or more pilot groups. The pilot groups can be identified by an identification number. In some implementations, the identification of the pilot groups can include identifiers of the pilots in the group.

For example, an access node can consider pilot strength measurement report messages in the grouping of pilots. If pilot grouping is enabled (such as after 520, 525 in process 500 (FIG. 5)), the DynamicPilotGroupingEnabled field 640 is set to '1' and PilotGroupID field 645 indicates the ID of the pilot group to which a candidate pilot belongs. If pilot grouping is not enabled (such as after 515 in process 500 (FIG. 5)), the DynamicPilotGroupingEnabled field 640 is set to '0' and PilotGroupID field is not included for the candidate pilot in the overhead message.

In some implementations, overhead message 600 can include one or more additional fields, including fields that identify the latitude and longitude of the access node, fields that identify a local time offset, and the like.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of implementations have been described. Nevertheless, it will be understood that various modifications may be made without. Accordingly, other implementations are within the scope of the following claims.

What is claimed is:

1. A method for providing communications between an access node (AN) and one or more access terminals (ATs) in a multi-carrier wireless network, comprising:
   broadcasting a Pilot Pseudo-Noise (PN) of each neighboring sector pilot to each AT in an overhead message generated by the AN;
   measuring pilot signals received at each ATs that are on different frequency channels;
   comparing signal strengths of the received pilots that have the same Pilot PN and belong to the AN;
   forming a pilot group when determining that pilot signal strength variance among the measured pilot signals fall with a threshold; and
   after formation of the pilot group, reporting pilot strength measurement of only one pilot from the pilot group to the AN.

2. The method as in claim 1, further comprising selecting pilots in a pilot group that subsequently fail to meet the threshold to form at least one different group.

3. The method as in claim 1, further comprising subsequently modifying the formed pilot group by removing one or more pilots that previously met the threshold for the formed pilot group but no longer meet the threshold.

4. The method as in claim 1, further comprising sending an overhead message from the AN, wherein the overhead message identifies the pilots and the group.

5. A method comprising:
   receiving transmissions of two or more pilot signals at an access terminal of a wireless communications network that includes an access node, wherein the two or more pilot signals correspond to different frequency channel bands and have the same pilot pseudo-noise code;
   based on characteristics of the transmissions of the two or more pilot signals from the access node to the access terminal, determining whether to form a group with the two or more pilot signals; and
   indicating of the suitability of the two or more pilot signals for grouping by sending a pilot information report for the pilot group to the access node,
   wherein the characteristics of the transmissions of the two or more pilot signals comprise pilot strengths of the two or more pilot signals, and
   wherein the determining comprises identifying a pilot strength variance among the two or more pilot signals and comparing the identified pilot strength variance with a threshold range.

6. The method of claim 5, wherein determining whether the two or more pilot signals are suitable for grouping comprising determining, at the access terminal, whether strengths of the pilot signals fall within a range.

7. The method of claim 6, further comprising receiving, at the access terminal, information characterizing the range in an overhead message from the access node.

8. The method of claim 5, wherein indicating the suitability of the two or more pilot signals for grouping comprises sending individual pilot information reports for the two or more pilot signals.

9. A method comprising:
   receiving transmissions of two or more pilot signals at an access terminal of a wireless communications network that includes an access node;
   based on characteristics of the transmissions of the two or more pilot signals from the access node to the access terminal, determining whether the two or more pilot signals are suitable for grouping;
   indicating of the suitability of the two or more pilot signals for grouping by sending a pilot information report for the pilot group to the access node
   receiving, at the access node, the indication of the suitability of the two or more pilot signals for grouping in a pilot information report; and
   based on the receipt of the indication, broadcasting an overhead message identifying the two or more pilot signals as a pilot group.

10. The method of claim 9, further comprising:
    determining whether all candidate pilot signals are in the pilot group; and
    disabling subsequent transmissions of identifications of the pilot group.

11. A method comprising:
    receiving transmissions of two or more pilot signals at an access terminal of a wireless communications network that includes an access node;
    based on characteristics of the transmissions of the two or more pilot signals from the access node to the access terminal, determining whether the two or more pilot signals are suitable for grouping;
    indicating of the suitability of the two or more pilot signals for grouping by sending a pilot information report for the pilot group to the access node
    receiving the indication of the suitability at the access node; and
    in response to the receipt of the indication, broadcasting an overhead message identifying that a pilot group has been disbanded.

12. An access terminal comprising:
    a strength determining module configured to determine a strength of pilot signals received at the access terminal, wherein the pilot signals correspond to different frequency channel bands and have the same pilot pseudo-noise code;
    a comparison module configured to compare strengths of pilot signals received at the access terminal with a range of pilot strengths to determine whether the strengths of pilot signals are sufficiently similar to be suitable for grouping; and an overhead message-generating module configured to indicate suitability of two or more pilots for grouping by sending measurements of one of the two or more pilots to the access node, wherein the comparison module is further configured to identify a pilot strength variance among the received pilot signals and determine whether the identified pilot strength variance is within the range of pilot strengths to determine whether the strengths of pilot signals are sufficiently similar to be suitable for grouping.

13. The access terminal of claim 12, further comprising a strength range data store configured to store the strength range.

14. An article comprising one or more tangible non-transitory machine-readable data storage media storing instructions operable to cause one or more machines to perform operations, the operations comprising:
receiving transmissions of two or more pilot signals of a wireless communications network that includes an access node, wherein the two or more pilot signals correspond to different frequency channel bands and have the same pilot pseudo-noise code;
comparing strengths of the transmissions of the two or more pilot signals with a range to determine whether a pilot strength variance of the strengths of the transmissions of the two or more pilot signals within the range to determine whether the two or more pilot strengths are suitable for grouping; and
based on results of the comparison, sending a message to an access node indicating that the two or more pilot signals are suitable for grouping.

15. An article comprising one or more tangible non-transitory machine-readable data storage media storing instructions operable to cause one or more machines to perform operations, the operations comprising:
receiving transmissions of two or more pilot signals of a wireless communications network that includes an access node;
comparing strengths of the transmissions of the two or more pilot signals with a range to determine whether the two or more pilot signals are suitable for grouping;
based on results of the comparison, sending a message to an access node indicating that the two or more pilot signals are suitable for grouping;
receiving a subsequent message identifying that the two or more pilot signals are in a pilot group; and
reporting the pilot group rather than the two or more pilot signals in the pilot group.

16. A method comprising:
receiving transmissions of two or more pilot signals of a wireless communications network that includes an access node, wherein the two or more pilot signals correspond to different frequency channel bands and have the same pilot pseudo-noise code;
comparing strengths of the transmissions of the two or more pilot signals in pilot group with a range to determine whether a pilot strength variance of the transmissions of the two or more pilot signals are within the range to determine whether the two or more pilot signals are suitable for grouping; and
based on results of the comparison, sending a message to an access node indicating that the two or more pilot signals are unsuitable for grouping.

17. The method of claim 16, wherein sending the message to the access node indicating that the two or more pilot signals are unsuitable for grouping comprises reporting pilot strength measurement of each pilot individually.

18. A method comprising:
receiving pilot measurement strength reports at an access node;
determining whether the strengths of two or more pilots described in the pilot measurement strength reports are sufficiently dissimilar to warrant a change in grouping of the two or more pilots;
changing the grouping of the two or more pilots based on the strengths of two or more pilots described in the pilot measurement strength reports; and
broadcasting an identification of the changed group.

19. The method of claim 18, wherein broadcasting the identification of the changed group comprises broadcasting an overhead message indicating that a new group has been formed.

20. The method of claim 18, further comprising:
determining that more than one pilot measurement strength reports has not been received for pilots from the same access node and having the same pseudonoise code; and
disabling dynamic grouping of the pilots at the access node.

* * * * *